J. MARTI.
SHEATHING FOR TIRES.
APPLICATION FILED APR. 27, 1907.
918,350.
Patented Apr. 13, 1909.
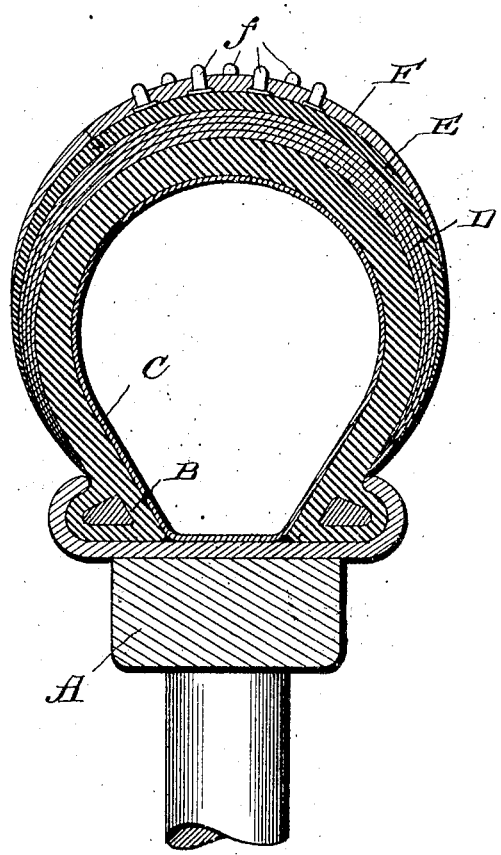

UNITED STATES PATENT OFFICE.

JOSÉ MARTI, OF MILAN, ITALY.

SHEATHING FOR TIRES.

No. 918,350.

Specification of Letters Patent.

Patented April 13, 1909.

Application filed April 27, 1907. Serial No. 370,614.

*To all whom it may concern:*

Be it known that I, JOSÉ MARTI, a subject of the King of Italy, residing at Milan, Italy, have invented certain new and useful Improvements in Sheathing for Tires; and I do hereby declare the following to be a full, clear, and exact description of the invention, such as will enable others skilled in the art to which it appertains to make and use the same.

My invention relates to a sheathing for tires for automobile wheels, the wheels of cycles, and all sorts of vehicles, made of imperforable material, as will be hereinafter described.

The sheathing referred to, besides the advantage of imperforability and an elasticity, similar to those actually in use, has the additional advantage of reducing to the minimum possible the necessary quantity of rubber, gum, or other substances, serving the same end, with a considerable economic advantage.

The sheathings referred to are constructed by superposing as many layers of very strong cotton cloth, or other tissue, sufficient to obtain a total resistance corresponding to the strain to which the tires will be subjected in relation to the weight and the motive power of the vehicle for which they are intended. The various layers are prepared of different dimensions and very carefully. A certain number of the outer layers are broader than would be necessary for the width of the tire, and the remaining layers diminish gradually in width so as to secure, as far as possible, the desired form to the tire sheathing, so that the thickness and resistance may be as great as possible in the central part or tread, which wears against the roadway, and may gradually decrease toward the edges. The layers of cloth in the parts, destined to form the body of the tire sheathing, are sewed crosswise and in close seams, except in the tread, preferably by suitable machines, with a thread of cotton, or other suitable textile material, in order to obtain a solid union, and at the same time secure the initial curvature.

The stuff of which different layers are to be made, should be soaked in a bath and afterward carefully washed in order to remove all finishing material, and to shrink same fully. Then the layers of stuff should be sewed in the manner above described, and should then be immersed for a suitable time in boiling water, and then rapidly dried by a current of hot air, so that the shrinkage of the thread, which has sewed the layers together, will assist in rendering more solid and compact the union of the layers themselves. It might be desirable that the drying of the stuff at a high temperature be continued only long enough to completely dry the outer faces of the material, leaving the rest to dry slowly at normal temperatures. After this last process, the sheathing prepared as hereinbefore described, is given the desired form in relation to the wheels of the vehicle to which the tire is intended, and that is accomplished by means of suitable molds. When the tire sheathing has been shaped, the interior face is covered with a coating of rubber, or varnish, or other substance apt to render it impermeable, and to give a smooth and even wear surface to be exposed to the air tube. Where a sheathing with a rough surface bearing against this tube is used, the rough surface of the sheathing is after a time imprinted on the yielding tube, materially weakening the latter. If the tire sheathing thus manufactured is to be made anti-slipping, besides a thin layer on the exterior of rubber, there should be an outer layer on the tread, of chrome leather with nails riveted therein, and joined to the tire sheath itself by a cement suitable for this purpose. If, on the contrary, the tire is to be used for racing automobiles, where, more than anything else, it is necessary to obtain great speed, it will suffice to apply, besides a very thin exterior layer of rubber, a thin and special layer of leather, as a protection to the tread. If, however, it is desired to have the tire appear exteriorly, like those in common use, in this case, instead of having on the exterior face a single thin layer of rubber, there should be several layers. All these additions of leather and rubber are easily renewed at slight expense. The sheathing is applied to the tire in the usual way.

The invention is illustrated by the accompanying drawing, which shows a section through the rim of the wheel with the tire mounted thereon.

A represents the rim of the wheel, in which the outer tube B is mounted in the usual way, inclosing the air tube C.

D represents the layers of cloth sewed together, as hereinbefore described.

E represents the exterior rubber casing, and F represents the armor of chrome leather having the rivets f.

It will be obvious that the relative thickness of the cloth, rubber, and leather may be varied at will.

Having thus described my invention, what I claim and desire to secure by Letters Patent of the United States, is:—

1. The process of making a sheathing for tires, which consists in suitably shaping a plurality of outer layers of cloth, broader than is necessary for the width of the tire, and suitably shaping a plurality of inner layers which gradually diminish in width, then washing and shrinking all the layers, then sewing the same together, then soaking the same in hot water and then rapidly drying the same in a current of hot air and finally molding the said layers into shape substantially as described.

2. The process of making a sheathing for tires, which consists in suitably shaping a plurality of outer layers of cotton cloth, and also suitably shaping a plurality of inner layers of cotton cloth which gradually diminish in width, then washing and shrinking the same, then sewing the said layers in close seams, then soaking the same in hot water then drying in a current of hot air, then molding the same into suitable shape and finally covering the exterior with a layer of rubber substantially as described.

3. The process of making a sheathing for tires, which consists in suitably shaping a plurality of outer layers of cotton cloth, and also suitably shaping a plurality of inner layers of cotton cloth which gradually diminish in width, then washing and shrinking the same, then sewing the said layers in close seams, then soaking the same in hot water, then drying in a current of hot air, then molding the same into suitable shape and cementing a chrome leather tread to said layers substantially as described.

In testimony whereof, I affix my signature, in presence of two witnesses.

JOSÉ MARTI.

Witnesses:
   OZVALDO BELLAVITA,
   M. DIENDORFER, Jr.